United States Patent
Inaba et al.

(10) Patent No.: US 10,406,820 B2
(45) Date of Patent: Sep. 10, 2019

(54) INKJET RECORDING APPARATUS

(71) Applicant: Konica Minolta, Inc., Tokyo (JP)

(72) Inventors: Yasunori Inaba, Hino (JP); Mitsuo Kaburagi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/036,493

(22) Filed: Jul. 16, 2018

(65) Prior Publication Data

US 2019/0030913 A1   Jan. 31, 2019

(30) Foreign Application Priority Data

Jul. 27, 2017  (JP) .................. 2017-145097

(51) Int. Cl.
| | |
|---|---|
| *B41J 2/21* | (2006.01) |
| *B41J 2/16* | (2006.01) |
| *B41J 11/00* | (2006.01) |
| *C09D 11/40* | (2014.01) |
| *B41J 2/045* | (2006.01) |

(52) U.S. Cl.
CPC ........... *B41J 2/2107* (2013.01); *B41J 2/0452* (2013.01); *B41J 2/1629* (2013.01); *B41J 2/2135* (2013.01); *B41J 2/2146* (2013.01); *B41J 11/007* (2013.01); *B41J 11/0015* (2013.01); *B41J 11/0085* (2013.01); *B41J 11/0095* (2013.01); *C09D 11/40* (2013.01)

(58) Field of Classification Search
CPC ...... B41J 2/2107; B41J 2/0452; B41J 2/1629; B41J 2/2135; B41J 2/2146; B41J 11/0015; B41J 11/007; B41J 11/0085; B41J 11/0095; B41J 11/40
USPC .......................................................... 347/20
See application file for complete search history.

(56) References Cited

U.S. PATENT DOCUMENTS

| | | | |
|---|---|---|---|
| 7,216,948 B2 * | 5/2007 | Matsuzaki | B41J 2/04505 347/14 |
| 2002/0193191 A1 * | 12/2002 | Downing | B41J 11/007 474/103 |
| 2006/0050099 A1 * | 3/2006 | Murakami | B41J 11/007 347/19 |

(Continued)

FOREIGN PATENT DOCUMENTS

JP   2004104457 A   4/2004

*Primary Examiner* — Huan H Tran
*Assistant Examiner* — Alexander D Shenderov
(74) *Attorney, Agent, or Firm* — Lucas & Mercanti, LLP

(57) ABSTRACT

An inkjet recording apparatus includes: a conveyor having an endless conveying belt that conveys a recording medium; an image former that forms an image on the recording medium conveyed by the conveying belt; a correction mark formed on the conveying belt; a line sensor disposed downstream of the image former in a conveying direction of the recording medium, the line sensor having a linear detection surface; and a hardware processor that controls the conveying belt, the image former, and the line sensor, wherein the hardware processor calculates an inclination angle of the detection surface of the line sensor with respect to a width direction orthogonal to the conveying direction, based on image data of the correction mark read by the line sensor, and corrects image data of the line sensor based on the inclination angle.

6 Claims, 6 Drawing Sheets

(56) References Cited

U.S. PATENT DOCUMENTS

2009/0161142 A1\* 6/2009 Miyadera ........... G03G 15/0131
358/1.14
2012/0086957 A1\* 4/2012 Hayashi ................ B41J 11/008
358/1.5

\* cited by examiner

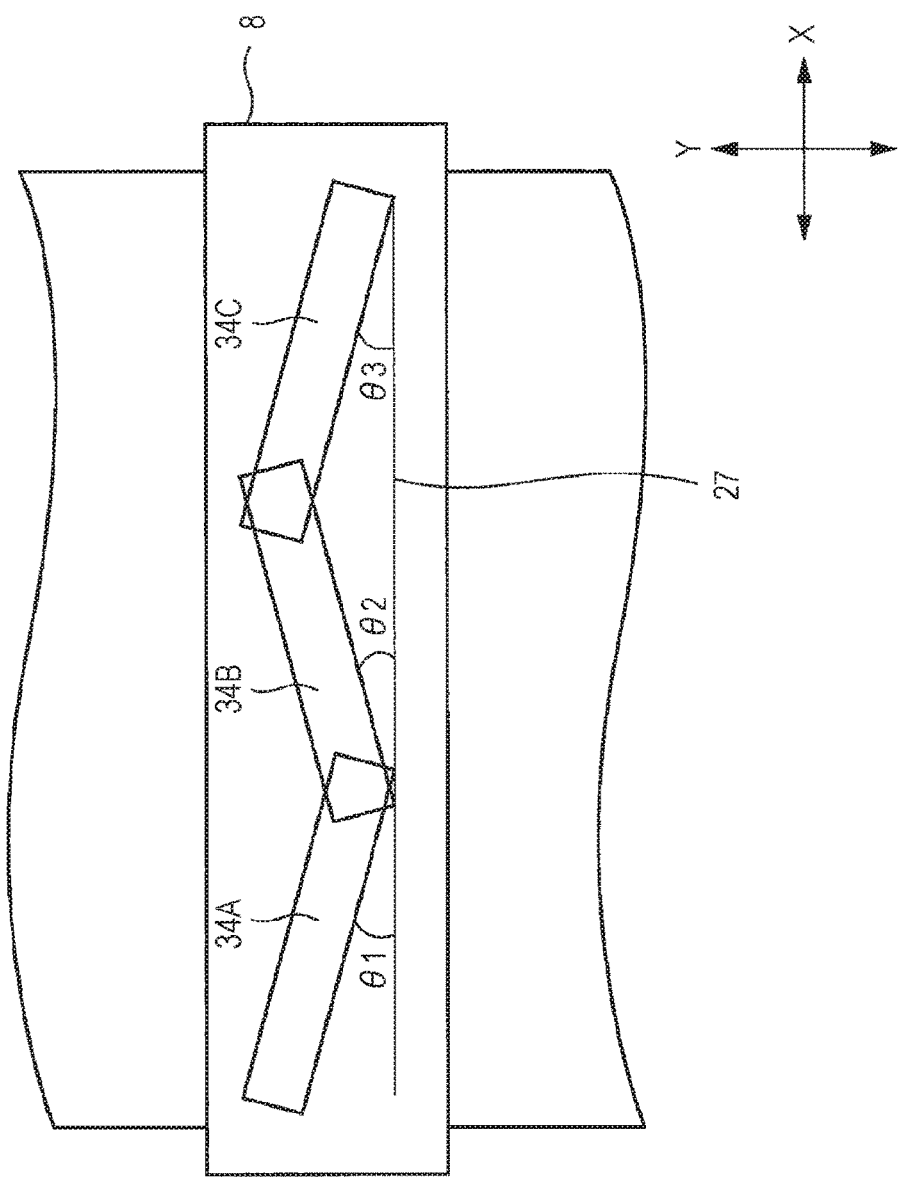

INKJET RECORDING APPARATUS

The entire disclosure of Japanese patent Application No. 2017-145097, filed on Jul. 27, 2017, is incorporated herein by reference in its entirety.

BACKGROUND

Technological Field

The present invention relates to an inkjet recording apparatus for forming an image by ejecting ink onto a recording medium.

Description of the Related Art

Conventionally, there is an inkjet recording apparatus that forms an image by ejecting ink from a plurality of nozzles provided in an ink ejector and causing ink to arrive at a desired position on a recording medium. In this inkjet recording apparatus, there is a possibility that the position of the nozzle may deviate from an originally set position due to, for example, a deviation in the mounting angle of the ink ejector, or an abnormality may occur in an ink ejecting direction due to ink ejection failure. In this case, since a deviation occurs in a landing position of the ink ejected from the nozzle on the recording medium, image quality is deteriorated.

Therefore, there is conventionally proposed a technique of detecting a deviation in the landing position and correcting the landing position, by disposing an image reader having an inline sensor downstream of an inkjet head in a conveying direction and reading a test chart with the image reader. The detection surface of the inline sensor is disposed in a direction orthogonal to the conveying direction.

However, if the attachment position of a line sensor inclines with respect to the direction orthogonal to the conveying direction, a deviation occurs also in an image detected by the line sensor, and thus correction cannot be performed accurately. Accordingly, JP 2004-104457 A describes a technique of adjusting the inclination of a line sensor by forming a test chart for adjustment of the line sensor on a recording medium and reading the test chart for adjustment with the line sensor.

However, the technique described in JP 2004-104457 A has a problem in that when a deviation occurs in the conveyance position of the recording medium, a deviation occurs also in the position of the test chart for adjustment read by the line sensor, and it is thus impossible to accurately detect the inclination of the line sensor.

SUMMARY

An object of the present invention is to provide an inkjet head apparatus capable of accurately detecting the inclination of a line sensor in view of the above-described conventional problems.

To achieve the abovementioned object, according to an aspect of the present invention, an inkjet recording apparatus reflecting one aspect of the present invention comprises: a conveyor having an endless conveying belt that conveys a recording medium; an image former that forms an image on the recording medium conveyed by the conveying belt; a correction mark formed on the conveying belt; a line sensor disposed downstream of the image former in a conveying direction of the recording medium, the line sensor having a linear detection surface; and a hardware processor that controls the conveying belt, the image former, and the line sensor, wherein the hardware processor calculates an inclination angle of the detection surface of the line sensor with respect to a width direction orthogonal to the conveying direction, based on image data of the correction mark read by the line sensor, and corrects image data of the line sensor based on the inclination angle.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is an explanatory drawing showing the correction processing of the line sensors of the image reader in the inkjet recording apparatus according to the embodiment example of the present invention.

DETAILED DESCRIPTION OF EMBODIMENTS

Hereinafter, one or more embodiments of the present invention will be described with reference to the drawings. However, the scope of the invention is not limited to the disclosed embodiments. It should be noted that in each drawing, common members are denoted by the same reference signs.

1. Embodiment Example 1-1. Configuration Example of Inkjet Recording Apparatus First, a configuration example of an inkjet recording apparatus according to the embodiment example of the present invention (hereinafter referred to as "the present example") will be described with reference to FIG. 1.

Figure 1:
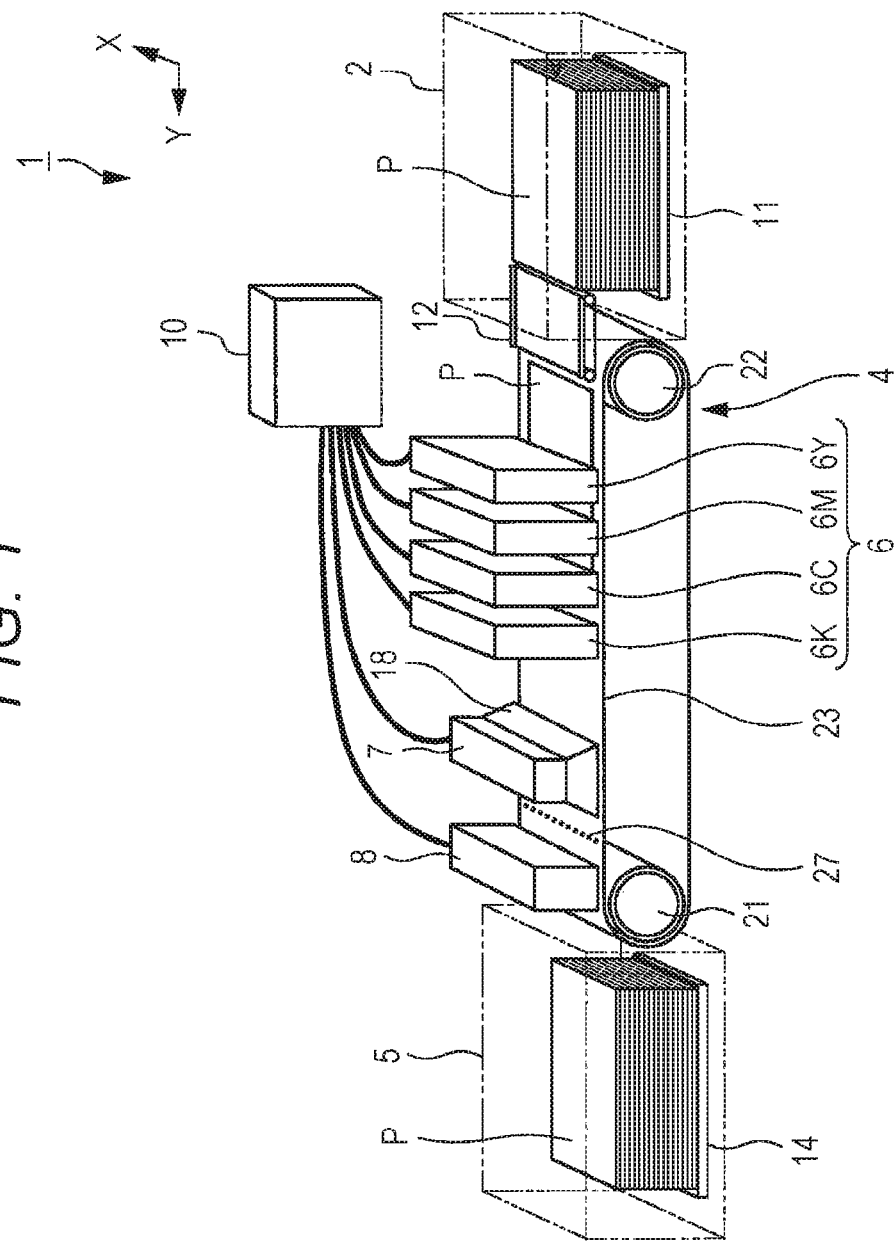
FIG. 1 is an entire configuration diagram showing an inkjet recording apparatus according to an embodiment example of the present invention.

FIG. 1 is a schematic configuration diagram showing an entire configuration of the inkjet recording apparatus.

An inkjet recording apparatus 1 shown in FIG. 1 forms (records) an image on a paper sheet by ejecting ink from nozzles provided in an inkjet head. The inkjet recording apparatus 1 is a color inkjet recording apparatus that superimposes ink of four colors of yellow (Y), magenta (M), cyan (C), and black (Bk).

The inkjet recording apparatus 1 includes a paper feeder 2, a conveyor 4, a discharger 5, an image former 6, a fixer 7, an image reader 8, and a controller 10. The inkjet recording apparatus 1 forms, on a paper sheet P, an image of image data input from an external device 100 (see FIG. 4).

The paper feeder 2 includes a paper feed tray 11 and a paper supplier 12. The paper feed tray 11 is a plate-like member provided in a manner where the paper sheet P showing an example of a recording medium can be placed thereon. The paper feed tray 11 is provided in a manner vertically movable according to the number of the paper sheets P placed thereon. Among a plurality of the paper sheets P placed on the paper feed tray 11, the paper sheet P positioned uppermost in the vertical direction is held at a position for conveyance by the paper supplier 12.

The paper supplier 12 includes a plurality of (two in the present example) rollers and a belt member. The belt member is formed in an endless shape in which both ends in its longitudinal direction are connected. The belt member is stretched around the rollers. As one of the rollers is rotationally driven, the belt member moves between the two rollers in a circulative manner. Accordingly, the paper sheet P placed on the belt member is conveyed.

In addition, the paper supplier 12 includes a driver (not shown) for rotationally driving the rollers, and a feeding device for delivering the paper sheet P placed uppermost on the paper feed tray 11 to the belt member. The paper supplier 12 conveys the paper sheet P placed on the belt member toward the conveyor 4, and feeds the paper sheet P to the image former 6.

Furthermore, the paper supplier 12 includes a guide member for properly adjusting the position of the paper sheet P in its width direction X orthogonal to its conveying direction Y. The paper supplier 12 adjusts the position of the paper sheet P to be fed to the conveyor 4, to a predetermined position in the width direction X.

The conveyor 4 includes a driving roller 21, a driven roller 22, and a conveying belt 23. The driving roller 21 and the driven roller 22 are formed in a substantially cylindrical shape. The driving roller 21 and the driven roller 22 are disposed in such a manner that their axial directions are parallel to the width direction X. The driving roller 21 and the driven roller 22 are disposed at a predetermined distance in the conveying direction Y. In the present example, the driving roller 21 is disposed downstream of the driven roller 22 in the conveying direction Y. The driving roller 21 is connected to a conveyance driver 51 (see FIG. 4). The driving roller 21 is rotationally driven by the conveyance driver 51.

Figure 2:
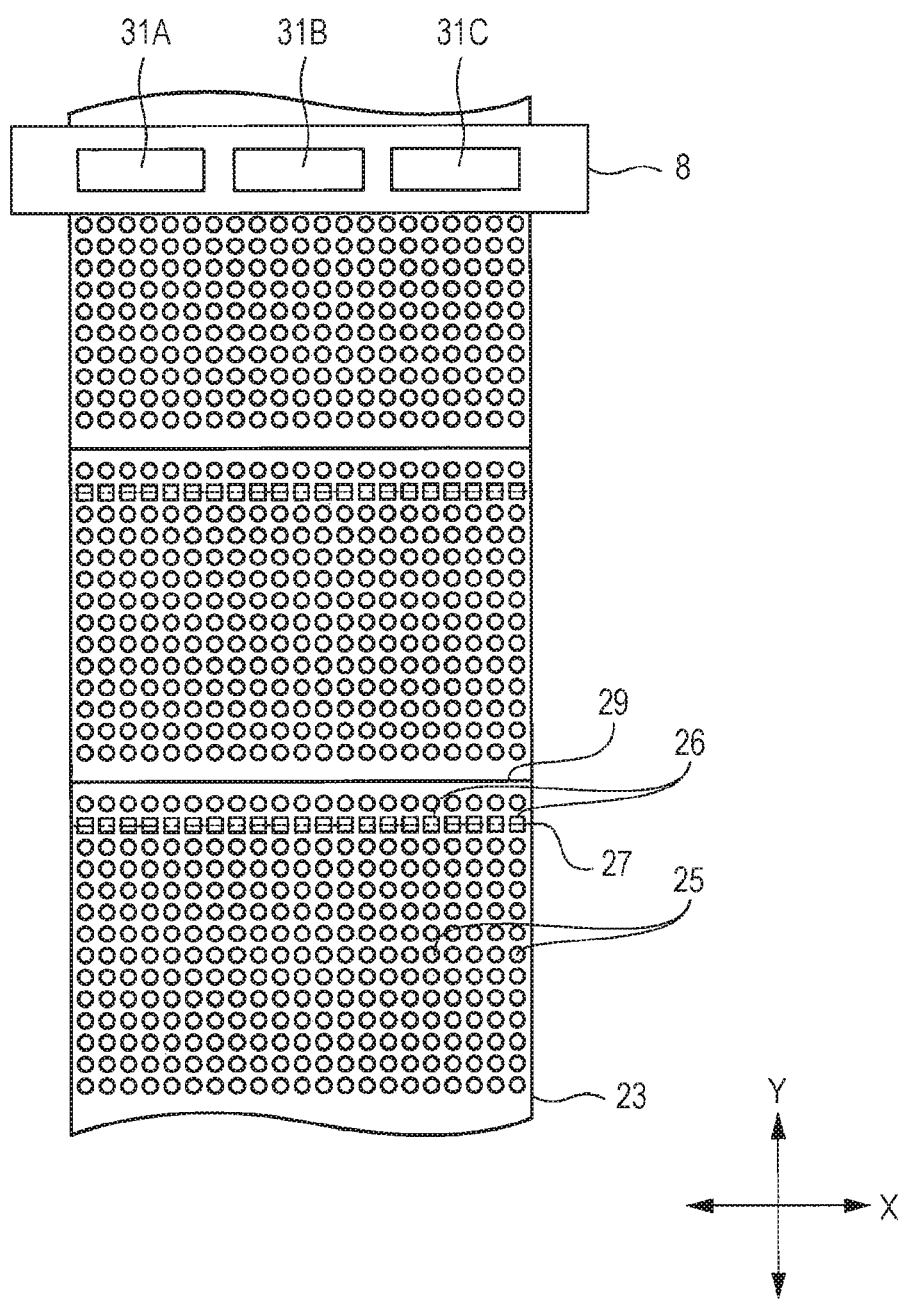
FIG. 2 is a plan view showing a conveying belt of a conveyor and an image reader in the inkjet recording apparatus according to the embodiment example of the present invention.

FIG. 2 is a plan view showing the conveying belt 23 and the image reader 8.

As shown in FIG. 2, the conveying belt 23 is formed of a steel belt formed by joining a plurality of flexible tabular steel plates together. Joints 29 between the steel plates of the conveying belt 23 are formed in parallel with the width direction X. As shown in FIG. 1, the conveying belt 23 is formed in an endless shape in which both ends in its longitudinal direction are connected.

Additionally, as shown in FIG. 2, a plurality of suction holes 25 is opened in the conveying belt 23. The suction holes 25 are opened in a substantially circular shape. Furthermore, some suction holes 26 among the plurality of suction holes 25 are opened in a quadrangular shape. Hereinafter, the suction holes 26 opened in a quadrangular shape are referred to as correction line suction holes 26. The suction holes 25 and the correction line suction holes 26 are formed in the steel plates by etching.

A plurality of the correction line suction holes 26 is formed in line in parallel with the width direction X. In addition, the plurality of correction line suction holes 26 is formed at intervals from one end to the other end of the conveying belt 23 in the width direction X. A correction line 27 showing an example of a correction mark is formed of the plurality of correction line suction holes 26. Therefore, the correction line 27 is formed in parallel with the width direction X orthogonal to the conveying direction Y. The correction line 27 is continuously formed from one end to the other end of the conveying belt 23 in the width direction X.

It should be noted that an example of the correction line 27 formed of the plurality of correction line suction holes 26 formed by etching has been described in the present example, while the embodiment of the present invention is not limited thereto. For example, the correction line 27 may be formed by printing on the conveying belt 23 as long as it can be read by line sensors 34A, 34B, and 34C to be described below.

However, forming the correction line suction holes 26 by etching can prevent the correction line 27 from disappearing due to long-term use. Furthermore, it is possible to easily form the correction line 27 by using the suction holes 26 as the correction line 27.

Moreover, an example of applying, as a correction mark, the linear correction line 27 continuously formed from one end to the other end of the conveying belt 23 in the width direction X has been described, while the embodiment of the present invention is not limited thereto. The correction marks just need to be formed at least at two positions, that is, one end and the other end of the conveying belt 23 in the width direction X. As long as a line connecting the two correction marks is disposed in parallel with the width direction X, the purpose thereof can be achieved.

As described above, the joints 29 of the conveying belt 23 are formed in parallel with the width direction X. Therefore, the joints 29 of the conveying belt 23 may be applied as the correction marks.

As shown in FIG. 1, the conveying belt 23 with the above-described configuration is stretched around the driving roller 21 and the driven roller 22. As the driving roller 21 is rotationally driven, the conveying belt 23 moves between the driving roller 21 and the driven roller 22 in a circulative manner. As a result, the paper sheet P placed on the conveying belt 23 is conveyed.

In addition, the conveyor 4 includes a suction part (not shown). The suction part includes a suction fan. The suction part is disposed on a surface opposite to a placement surface of the conveying belt 23, on which the paper sheet P is placed. The suction part sucks the paper sheet P via the suction holes 25 and 26 provided in the conveying belt 23. Thus, it is possible to prevent deviation in the position of the paper sheet P when the paper sheet P is conveyed by the conveyor 4.

Furthermore, the image former 6, the fixer 7 and the image reader 8 are disposed to face the placement surface of the conveying belt 23 of the conveyor 4. The image former 6 is disposed upstream of the fixer 7 and the image reader 8 in the conveying direction Y.

The image former 6 has four head units 6Y, 6M, 6C, and 6K corresponding to yellow (Y), magenta (M), cyan (C), and black (K), respectively. The four head units 6Y, 6M, 6C, and 6K are disposed in the order of, for example, yellow, magenta, cyan, and black, from the upstream side in the conveying direction Y.

The head units 6Y, 6M, 6C, and 6K are set to have a length (width) that covers the entire paper sheet P in the width direction X. That is, the inkjet recording apparatus 1 is a single-pass type line head inkjet recording apparatus. The four head units 6Y, 6M, 6C, and 6K have the same configurations except that the colors of ink to be ejected therefrom are different from each other.

Figure 4:
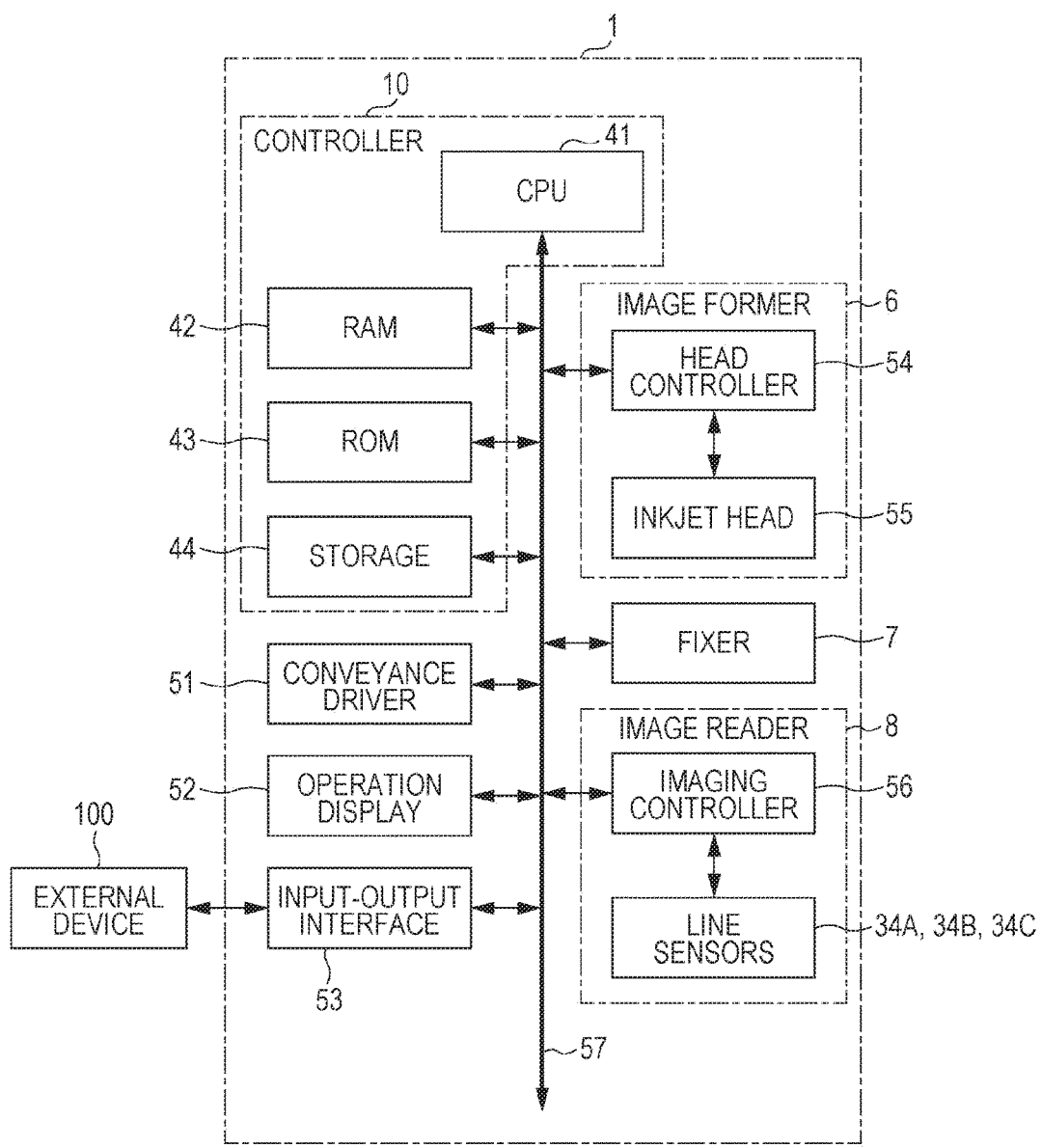
FIG. 4 is a block diagram showing a configuration of a control system in the inkjet recording apparatus according to the embodiment example of the present invention.

The head units 6Y, 6M, 6C, and 6K include a plurality of inkjet heads 55 (see FIG. 4). A set of the two inkjet heads 55 forms a single inkjet module.

A plurality of the inkjet modules is arranged in two rows along the conveying direction Y. Each row includes the four inkjet modules arranged along the width direction X. Furthermore, the two rows of the inkjet modules are arranged in a staggered manner along the conveying direction Y. It should be noted that the head units 6Y, 6M, 6C, and 6K may be a single head unit which includes a plurality of nozzles disposed in a single unit.

In addition, the inkjet head 55 has a plurality of nozzles. The inkjet head 55 ejects ink from the nozzles toward the paper sheet P. As a result, an image is formed on the paper sheet P placed on the conveying belt 23 of the conveyor 4.

It should be noted that a heater for heating the paper sheet P to a predetermined temperature may be provided between the image former 6 and the paper feeder 2.

The fixer 7 is disposed downstream of the image former 6 in the conveying direction Y. For example, a fluorescent tube that irradiates an object with ultraviolet rays, such as a low-pressure mercury lamp, is applied as the fixer 7. The fixer 7 irradiates, with ultraviolet rays, the paper sheet P conveyed by the conveying belt 23, and cures the ink ejected on the paper sheet P. As a result, the fixer 7 fixes the image formed on the paper sheet P.

Examples of a fluorescent tube that emits ultraviolet rays include a mercury lamp having an operating pressure of around several hundred Pa to 1 MPa, a light source available as a sterilizing lamp, a cold cathode tube, an ultraviolet laser light source, a metal halide lamp, and a light emitting diode as well as a low-pressure mercury lamp. Among them, it is more desirable to adopt a light source (for example, a light emitting diode) which can apply ultraviolet rays with higher illuminance and consumes less power.

It should be noted that the fixer 7 is not limited to one that irradiates an object with ultraviolet rays, but may be any device as long as it irradiates an object with energy rays having the property of curing ink depending on the property of the ink. A light source is also replaced depending on, for example, the wavelength of the energy rays. Furthermore, the fixer 7 is not limited to one that irradiates an object with light such as ultraviolet rays. As the fixer 7, it is possible to apply, for example, various other methods such as drying ink by applying heat to a paper sheet or applying liquid that causes a chemical change of ink.

Additionally, a light shielding plate 18 is provided at an end of the fixer 7, which faces the conveying belt 23. The light shielding plate 18 is disposed in a manner to surround the range of ultraviolet irradiation by the fixer 7. The light shielding plate 18 prevents ultraviolet rays from leaking out of the irradiation range. Therefore, it is possible to prevent ink from being cured in the nozzle of the inkjet head 55 as a result of the image former 6 being irradiated with ultraviolet rays emitted from the fixer 7.

Figure 3:
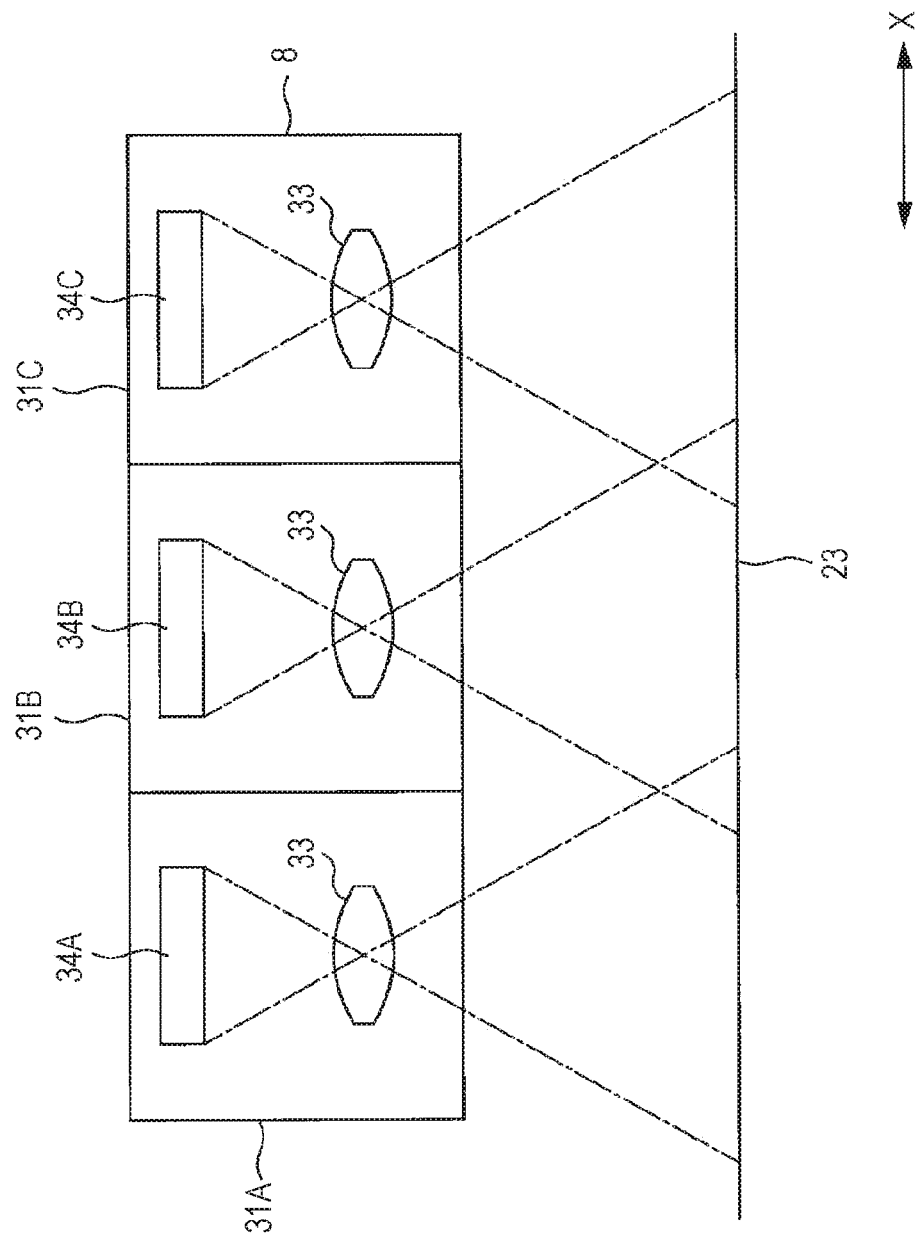
FIG. 3 is a schematic configuration diagram showing the image reader in the inkjet recording apparatus according to the embodiment example of the present invention.

Furthermore, the image reader 8 is disposed downstream of the fixer 7 in the conveying direction Y. FIG. 3 is a schematic configuration diagram showing the image reader 8.

As shown in FIGS. 2 and 3, the image reader 8 is disposed along the width direction X, in a manner to face the conveying belt 23. The image reader 8 includes a first imager 31A, a second imager 31B, and a third imager 31C. The first imager 31A, the second imager 31B, and the third imager 31C are arranged side by side along the width direction X.

As shown in FIG. 3, the first imager 31A includes a lens 33 and a first line sensor 34A. The lens 33 condenses light toward the first line sensor 34A. The first line sensor 34A includes, for example, a charge coupled device (CCD) sensor or a complementary metal oxide semiconductor (CMOS) sensor. In the first line sensor 34A, a plurality of detection elements is arranged side by side along the width direction X. That is, the detection surface of the first line sensor 34A is linearly arranged.

The first line sensor 34A reads the image on the paper sheet P, formed by the image former 6 and the fixer 7, and the correction line 27. Data of the read image are sent to the controller 10. It should be noted that the intervals between the detection elements forming the first line sensor 34A are set wider than the intervals between the nozzles of the inkjet head 55. That is, the resolution of the first line sensor 34A is set lower than the resolution of the head unit.

In addition, the second imager 31B includes the lens 33 and a second line sensor 34B. The third imager 31C includes the lens 33 and a third line sensor 34C. Since the configurations of the second imager 31B and the third imager 31C are the same as that of the first imager 31A, description thereof will be omitted.

Furthermore, the discharger 5 is disposed downstream of the image reader 8 in the conveying direction. That is, the discharger 5 is disposed most downstream in the conveying direction Y of the conveyor 4. The image former 6, the fixer 7, and the image reader 8 are disposed between the paper feeder 2 and the discharger 5.

The discharger 5 stores the paper sheet P conveyed from the conveyor 4, on which an image has been formed by the image former 6 and the fixer 7. The discharger 5 includes a tabular paper output tray 14. The paper sheet P having the image formed thereon is placed on the paper output tray 14 of the discharger 5.

1-2. Configuration Example of Control System

Next, the configuration of a control system of the inkjet recording apparatus 1 will be described with reference to FIG. 4.

FIG. 4 is a block diagram showing the configuration of the control system of the inkjet recording apparatus 1.

As shown in FIG. 4, the inkjet recording apparatus 1 includes the controller 10, the conveyance driver 51, an operation display 52, an input-output interface 53, the image former 6, the fixer 7, and the image reader 8. The controller 10 includes, for example, a central processing unit (CPU) 41, a random access memory (RAM) 42, and a read only memory (ROM) 43. The RAM 42 is used as a work area of the CPU 41. The ROM 43 stores, for example, programs to be executed by the CPU 41.

Furthermore, the controller 10 has a storage 44 that includes, for example, a hard disk drive (HDD) as a mass storage device. The storage 44 stores, for example, data information of the image read by the image reader 8.

The CPU 41 of the controller 10 is connected, via a system bus 57, to each of the image former 6, the fixer 7, the image reader 8, the RAM 42, the ROM 43, the storage 44, the conveyance driver 51, the operation display 52, and the input-output interface 53. The CPU 41 controls the entire apparatus.

Under the control of the controller 10, the conveyance driver 51 drives the driving roller 21 and the paper supplier 12 to feed and convey the paper sheet P at predetermined timing.

The operation display 52 is a touch panel formed of a display such as a liquid crystal display (LCD) and an organic electro luminescence display (ELD). The operation display 52 displays, for example, an instruction menu for a user, information relating to nozzle ejection detecting operation, information relating to the inclinations of the line sensors 34A, 34B, and 34C of the image former 6, and information relating to acquired image data. Moreover, the operation display 52 includes a plurality of keys, and functions as an input part that receives various instructions by a user's key operation and input of data such as characters and numerals.

The input-output interface 53 is connected to the external device 100 such as a personal computer (PC) and a facsimile machine. The input-output interface 53 receives image data from the external device 100. The input-output interface 53 outputs the received image data to the controller 10. Then, the controller 10 performs image processing on the image data received from the input-output interface 53. In addition, the controller 10 performs image processing on the received image data, such as shading correction, image density adjustment, and image compression, as necessary.

Furthermore, the image former 6 receives the image data subjected to the image processing by the controller 10, and forms a predetermined image on the paper sheet P based on the image data. Specifically, the image former 6 causes a head controller 54 to control the inkjet head 55 so that ink is ejected from the inkjet head 55 to a predetermined position.

The image formed on the paper sheet P by the image former 6 is read by the image reader 8, and image data thereof are sent to the controller 10. In addition, the image reader 8 causes an imaging controller 56 to control each of the line sensors 34A, 34B, and 34C to read the image at predetermined timing.

Moreover, the controller 10 extracts a reference line based on the image data sent from the image reader 8, and calculates the inclinations of the respective line sensors 34A, 34B, and 34C with respect to the reference line. Then, the controller 10 corrects the image data of the image reader 8 based on the calculated inclinations.

2. Inclination Correction Processing Method for Line Sensors

Next, an example of an inclination correction processing method for the line sensors 34A, 34B, and 34C in the inkjet recording apparatus 1 with the above-described configuration will be described with reference to FIGS. 5 and 6.

Figure 5:
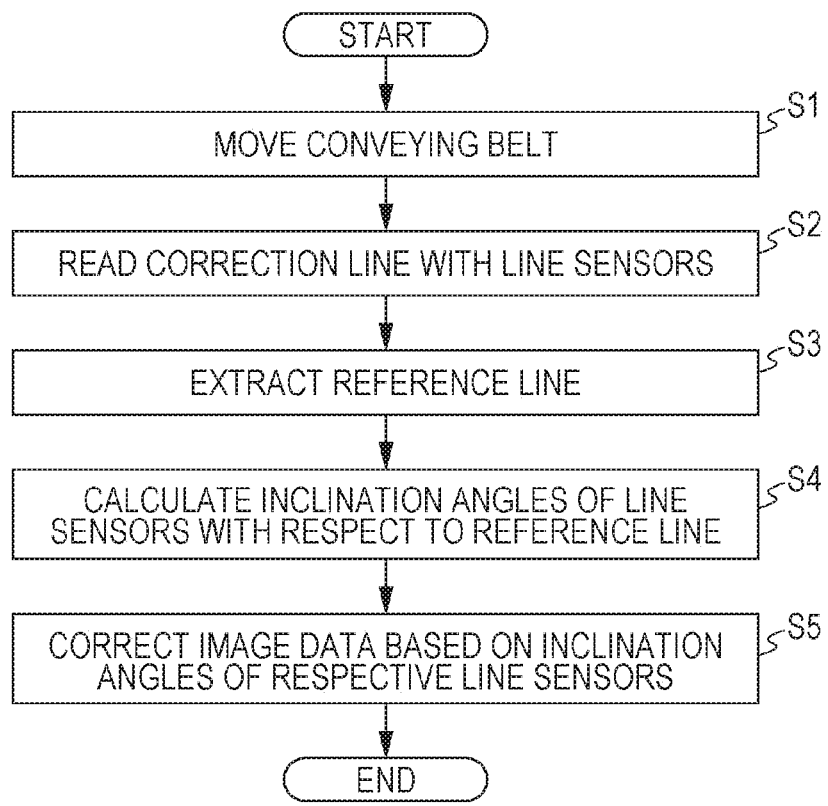
FIG. 5 is a flowchart showing correction processing of line sensors of the image reader in the inkjet recording apparatus according to the embodiment example of the present invention.

FIG. 5 is a flowchart showing the correction processing of the line sensors 34A, 34B, and 34C. FIG. 6 is an explanatory drawing showing the correction processing.

First, as shown in FIG. 5, the controller 10 controls and causes the conveyance driver 51 to drive the driving roller 21 in a state where the paper sheet P is not placed on the conveying belt 23. As a result, the conveying belt 23 moves between the driving roller 21 and the driven roller 22 in a circulative manner (step S1).

As the conveying belt 23 moves in a circulative manner, the correction line 27 formed of the plurality of correction line suction holes 26 passes through the image reader 8. Then, the three line sensors 34A, 34B, and 34C of the image reader 8 read the correction line 27 (step S2). The correction line suction holes 26 forming the correction line 27 are opened in a quadrangular shape unlike the other suction holes 25 opened in a circular shape. Therefore, the image reader 8 detects the correction line 27 by reading the corners of the correction line suction holes 26.

Next, based on image data of the correction line 27 read by the image reader 8, the controller 10 extracts a reference line that is parallel to the width direction X orthogonal to the conveying direction Y (step S3). Then, the controller 10 calculates the inclination angles of the respective line sensors 34A, 34B, and 34C with respect to the reference line (step S4). Specifically, as shown in FIG. 6, there are calculated inclination angles $\theta 1$, $\theta 2$, and $\theta 3$ of the detection surfaces of the line sensors 34A, 34B, and 34C with respect to the correction line 27, that is, the width direction X. The calculated inclination angles $\theta 1$, $\theta 2$, and $\theta 3$ are stored in, for example, the storage 44.

Based on the calculated inclination angles $\theta 1$, $\theta 2$, and $\theta 3$ of the line sensors 34A, 34B, and 34C, the controller 10 generates correction data for correcting image data detected by the respective line sensors 34A, 34B, and 34C (step S5). It should be noted that the correction data of the respective line sensors 34A, 34B, and 34C are stored in, for example, the storage 44. When the image formed on the paper sheet P is read and a landing position is corrected, the image data detected by the respective line sensors 34A, 34B, and 34C are corrected based on the correction data generated in the processing of step S5. Thus, the inclination correction processing for the respective line sensors 34A, 34B, and 34C is completed.

According to the inkjet recording apparatus 1 of the present example, there is formed, on the conveying belt 23, the correction line 27 serving as the reference line with respect to the inclinations of the line sensors 34A, 34B, and 34C. Therefore, deviation of the correction line 27 with respect to the width direction X is reduced, and it is thus possible to accurately adjust the inclinations of the line sensors 34A, 34B, and 34C.

The above-described correction processing is performed at the time of manufacture of the inkjet recording apparatus 1 or replacement of the image reader 8, the conveying belt 23, or the like.

In the above-described correction processing, an example of correcting the respective line sensors 34A, 34B, and 34C after a single detecting operation of the correction line 27 has been described. However, the embodiment of the present invention is not limited thereto. For example, it is possible to provide a plurality of the correction lines 27 on the conveying belt 23 and detect the plurality of correction lines 27 so that the respective line sensors 34A, 34B, and 34C may be corrected based on the average of the detected values. Alternatively, the correction line 27 may be detected a plurality of times while the conveying belt 23 is circulated a plurality of times. As a result, the correction accuracy of the respective line sensors 34A, 34B, and 34C can be improved.

Although embodiments of the present invention have been described and illustrated in detail, the disclosed embodiments are made for purposes of illustration and example only and not limitation. The scope of the present invention should be interpreted by terms of the appended claims, and various variations can be made without departing from the gist of the invention recited in the claims.

In the above-described embodiment example, an example of providing three line sensors has been described. However, the number of line sensors is not limited thereto. It is possible to provide four or more line sensors along the width direction X. Alternatively, just a single line sensor may be provided.

Furthermore, in the above-described embodiment example, an example of using a paper sheet as a recording medium has been described. However, the embodiment of the present invention is not limited thereto. Various other recording media such as cloth, plastic film, and a glass plate are applicable.

What is claimed is:

1. An inkjet recording apparatus comprising:
   a conveyor having an endless conveying belt configured to convey a recording medium;
   an image former configured to form an image on the recording medium conveyed by the conveying belt;
   a plurality of correction marks formed on the conveying belt, the plurality of correction marks is disposed in a line that is parallel to a width direction orthogonal to a conveying direction of the recording medium;
   a line sensor disposed downstream of the image former in the conveying direction of the recording medium, the line sensor having a linear detection surface; and
   a hardware processor that controls the conveying belt, the image former, and the line sensor,
   wherein the hardware processor calculates an inclination angle of the linear detection surface of the line sensor with respect to the width direction, based on image data of the plurality of correction marks read by the line sensor, and corrects image data of the line sensor based on the inclination angle.

2. The inkjet recording apparatus according to claim 1, wherein
   a plurality of suction holes is formed in the conveying belt,
   the conveyor has a suction part that sucks the recording medium via the plurality of suction holes, and
   some of the plurality of suction holes form the correction marks.

3. The inkjet recording apparatus according to claim 2, wherein
   the some of the plurality of suction holes that form the correction marks have a quadrangular shaped opening, and
   rest of the plurality of suction holes, not forming the correction mark, have a circular shaped opening.

4. The inkjet recording apparatus according to claim 1, wherein
   the correction mark is formed by etching of the conveying belt.

5. The inkjet recording apparatus according to claim 4, wherein
   the conveying belt is a steel belt.

6. The inkjet recording apparatus according to claim 1, wherein
   the hardware processor detects, with the line sensor, the plurality of correction marks a plurality of times, and calculates the inclination angle of the detection surface of the line sensor based on an average of detected values.

* * * * *